United States Patent [19]

Mattcheck

[11] Patent Number: 5,186,280
[45] Date of Patent: Feb. 16, 1993

[54] HIGH TEMPERATURE OVEN CONVEYOR CHAIN LUBRICATION SYSTEM

[76] Inventor: Donald L. Mattcheck, 5950 Beechdell Dr., Cincinnati, Ohio 45233

[21] Appl. No.: 695,298

[22] Filed: May 3, 1991

[51] Int. Cl.$^5$ ............................................. F16N 7/24
[52] U.S. Cl. .................................... 184/15.3; 198/500
[58] Field of Search ............... 184/2, 3.1, 3.2, 15.1, 184/15.2, 15.3, 6.1, 6.4, 7.4; 104/279; 198/500; 137/614.2

[56] References Cited

U.S. PATENT DOCUMENTS

| | | | |
|---|---|---|---|
| 1,294,200 | 2/1919 | Tritton | 184/15 |
| 1,933,464 | 10/1933 | West | 184/2 |
| 2,285,145 | 6/1942 | Burt | 74/257 |
| 2,593,841 | 4/1952 | Burchsted | 184/15 A |
| 3,684,059 | 8/1972 | Stoner | 184/15 B |
| 3,762,504 | 10/1973 | Banyas et al. | 184/15.2 |
| 3,771,623 | 11/1973 | Sugawara et al. | 184/15 A |
| 3,869,023 | 3/1975 | Thomson | 184/15 A |
| 3,903,994 | 9/1975 | Hafner | 184/15 A |
| 4,009,764 | 3/1977 | Hafner | 184/15 A |
| 4,024,930 | 5/1977 | Thomson et al. | 184/15 B |
| 4,064,970 | 12/1977 | Reeves | 184/15 B |
| 4,085,821 | 4/1978 | Kast et al. | 184/15 A |
| 4,109,758 | 8/1978 | Dolmonen et al. | 184/15 A |
| 4,271,930 | 6/1981 | Thomson et al. | 184/15 A |
| 4,274,509 | 6/1981 | Thomson et al. | 184/15 B |
| 4,368,803 | 1/1983 | Dombroski et al. | 184/15 B |
| 4,401,188 | 8/1983 | Weis et al. | 184/15 B |
| 4,520,901 | 6/1985 | Borup et al. | 184/3.1 |
| 4,537,285 | 8/1985 | Brown et al. | 184/15.2 |
| 4,630,712 | 12/1986 | Hoesley | 184/15.3 |
| 4,648,486 | 3/1987 | Kayser et al. | 184/15.1 |
| 4,657,115 | 4/1987 | Gresens | 184/6.1 |
| 4,679,659 | 7/1987 | Jendick | 184/15.2 |
| 4,745,990 | 5/1988 | Saretzky et al. | 184/15.2 |
| 4,881,928 | 11/1989 | Bernal | 474/111 |
| 4,884,203 | 7/1989 | Brown et al. | 184/15.3 |
| 4,977,979 | 12/1990 | King, Sr. et al. | 184/15.1 |

FOREIGN PATENT DOCUMENTS

2332401 1/1975 Fed. Rep. of Germany ...... 198/500

Primary Examiner—Ira S. Lazarus
Assistant Examiner—Alan B. Cariaso
Attorney, Agent, or Firm—Wood, Herron & Evans

[57] ABSTRACT

A system and method for lubricating conveyor chains, particularly with high temperature synthetic lubricants for use in ovens, by dispensing discrete shots of fluid onto the pin areas of the chains to lubricate only the pins and bushings. A check valve, preferably included in a metered shot valve, is positioned sufficiently close to the chain to accurately dispense and place the measured shot onto the point of the chain at which the lubricant is needed. A sensor detects the presence of the pins at a dispensing outlet and signals a controller, which energizes an on/off valve, preferably a direct current solenoid valve, at which fluid is supplied at constant pressure. The check valve opens with the on/off valve and closes in time to define the size of the metered shot. The controller causes the dispensing to occur on every one of a predetermined number of pins during each chain revolution with different pins lubricated on different revolutions until all are lubricated.

29 Claims, 2 Drawing Sheets

HIGH TEMPERATURE OVEN CONVEYOR CHAIN LUBRICATION SYSTEM

The present invention relates to the application of lubricant to conveyor chains, particularly to the application of high temperature synthetic lubricants to chain link conveyors for carrying product through ovens such as are employed in the glass industry.

BACKGROUND OF THE INVENTION

Endless conveyors are used in many industries to move articles. In industries such as the glass industry such conveyors are employed to carry fiberglass material, for example, fiberglass bats of building insulation, through high temperature ovens during its manufacture. Typically, such ovens employ conveyors driven by endless chains of conventional design which themselves pass through the high temperatures of the ovens.

The chains which drive the conveyors are well known. They are made up of a plurality of links which are each formed of a pair of parallel link plates joined at each end by a cylindrical rollers, which engage the notches of sprocket wheels that drive or are driven by the chains. Adjacent links are pivotally joined at the rollers. Each roller typically has a link pin at its axis surrounded by an annular bushing. The pins have a head at one end and a lock pin at the other to hold the adjacent links together.

Conveyor chains of this common type require continuous lubrication to prevent the wear of the contacting surfaces between the pins, the bushings and the rollers. With many uses of conventional chains, the occasional application of lubricant to the chain is sufficient, and application of the lubricant to the entire chain, including pins, bushings, collars and links, is common. Normally, petroleum based lubricating oils are adequate.

In high temperature applications such as are faced with the conveyor chains used in ovens such as those of the glass industry, ordinary lubrication methods have many disadvantages. In such applications, the conveyor chains are large, with approximately six inch links, and are, for example, fifty to two hundred feet in length. The chains operate continuously, and encounter constant temperatures of from 400 to 1000 degrees Fahrenheit. When such chains operate in this high temperature environment, ordinary oils will burn and lose their lubricating properties. This has required the use of specialty oils such as high temperature synthetic oils that can retain their lubricating properties in such high temperature environments.

High temperature synthetic lubricating oils are considerably more expensive than ordinary petroleum based lubricating oils, often over five times the price. Even these oils, when used in high temperature ovens, require constant reapplication, since even they will dissipate and leave the chain dry and unlubricated. Because of the size of the chains, when they are continuously and totally wetted with the lubricating oil, consumption of the oil is high, and significantly contributing to the overall manufacturing operation. Furthermore, as the oils encounter the heat of the ovens, vapors and smoke are generated in proportion to the amount of oil applied to the chains. The vapors and smoke that are produced must be exhausted away from the atmosphere and personnel within the manufacturing plant, and requires expensive air cleaning equipment to prevent the smoke and vapors from being released into the external atmosphere.

To solve some of the problems set forth above, it has been proposed to limit the amount of lubricant applied to the conveyor chains by selective application of the oil to only the pin and bushing assemblies of the chains. This has been done by intermittently dispensing discrete quantities of oil on the chain as it passes a lubrication station in an attempt to apply oil only at the junctures of the links. In doing so, prior art systems have met with only limited success.

The chains of conveyors that transport materials such as fiberglass through high temperature ovens move at fairly high speeds, of for example, up to 300 feet per minute. At 300 feet per minute, with chains of links that are six inches in length, 600 pins per minute, or 10 pins per second, pass any given lubrication station. In addition, in that the pins are approximately one ⅜th inch in diameter, they are adjacent the lubrication station little more than 1/100th of a second. This has made the application of the concept of applying lubricant only to the pins difficult to practice. In that the loss of lubrication can result in costly damage to the conveyor, or at least reduced chain life and higher power consumption, such systems of the prior art have had limited acceptance in the industry.

Efforts to time the dispensing of drops of lubricant and synchronize the application of the discrete amounts of lubricant with the pin positions have been proposed, such as in U.S. Pat. Nos. 3,869,023, 4,085,821, 4,271,930, 4,274,509 and 4,368,803 relating to one line of lubricators by the Madison/Kipp Corporation of Madison, Wis. These systems have switched the lubricating oil on and off at pump remote from the discharge point of the fluid onto the chain. With high speed conveyors such as are encountered in the glass industry, difficulty in switching the flow of lubricant on and off so as to keep up with the speed of the chain has resulted in either too much lubricant being applied, too little lubrication of the critical surfaces in contact with the link pin bushings, or both.

In U.S. Pat. Nos. 4,537,285 and 4,844,203, it has been proposed to lubricate only every one of a predetermined number of pins that pass the lubricant dispensing point. In theory, spacing the drops more widely should make it easier to trigger the initiation of the dispensing cycle, particularly where the system is otherwise slow to respond. However, the problem of precisely focusing of the dispensed fluid droplet onto the point of the chain at which it is needed is not solved by this concept.

DeLimon Fluhme & Co. of France has produced a shot valve, referred to as the DeLimon Lubricant Metering Element ZE-E, that dispenses a measured shot of lubricating fluid once every time fluid pressure is applied to valve inlet. This valve had been employed in a chain lubricating system once marketed by BiJur Corporation of Bennington, Vt. In the BiJur system, the valve was positioned adjacent the chain and intermittent application of lubricant to the valve was controlled at the pump located remotely at a lubricating fluid reservoir. The system attempted to apply lubricant to each consecutive pin of the chain, but could not effectively apply lubricant only to the pins of the chain with a chain that moved at high speed.

Accordingly, there still remains a need for a method and apparatus that will apply lubricant in economical but effective amounts on only the pin and bushing portions of a high speed conveyor chain such as are used in high temperature ovens in the manufacture of fiberglass. The systems of the prior art have been inadequate in filling this need.

SUMMARY OF THE INVENTION

It is a primary objective of the present invention to provide for the efficient and effective application of lubricant to a conveyor chain. It is a more specific objective of the present invention to provide for the efficient and effective application of high temperature synthetic lubricant to high speed conveyor chains for use in ovens in the manufacture of glass products such as fiberglass.

It is a further objective of the present invention to provide a method and apparatus for applying measured discrete shots of lubricant precisely on the link pins and bushings joining the links of chains that are continuously moving at high speed.

According to the principles of the present invention, there is provided a system that dispenses measured shots of lubricant onto the pins and bushings of a moving conveyor chain as the pins pass a lubricant dispensing station. Lubricating fluid is delivered to a supply line at a predetermined minimum operating pressure by a pump. Flow through the line is switched by an on/off valve, preferably a solenoid valve, located downstream of the pump. A dispensing outlet at the end of the line is located adjacent to, and is directed toward, the chain at the point where lubrication is needed, which is normally the inner and outer surfaces of the bushing between the pin and the chain roller at the juncture of the chain links. Downstream in the line from the on/off valve and close to the outlet is a check valve or other reverse flow preventing device to retain fluid in the line up to a point close to the outlet. The flow through the line as controlled by the operation of on/off valve and the effects of the check valve result in the dispensing of a discrete metered shot of lubricant from the outlet onto the surfaces to be lubricated. The check valve is positioned sufficiently close to the chain to accurately dispense the metered shot onto the point of the chain to be lubricated.

In accordance with the preferred embodiment of the present invention, in which the pump is located remote from the conveyor, the on/off valve is positioned closer to the discharge point than to the pump. Preferably, the on/off valve is located in proximity, and preferably in close proximity to the discharge point, but preferably not where it is exposed to temperatures such as those of an oven. The on/off valve is energized by a pulse from a microprocessor or controller. The pulse is synchronized to the position of the conveyor pins so as to feed the oil through a check valve, which is preferably in the form of a measured shot valve, at the junctures of the links of the chain.

In the preferred embodiment of the invention, lubricating fluid is supplied from a reservoir remote form the dispensing station through a supply line to a solenoid valve proximate the dispensing point, preferably in proximity to the dispensing point, for example, within approximately ten feet of the dispensing point. It is preferred that the solenoid be located in close proximity to the dispensing point, for example, within approximately five feet thereof. At the dispensing point, at least one nozzle or other fluid dispensing outlet is directed toward the chain. The nozzles may be formed by the open end of a dispensing tube that extends from the check valve. The dispensing tube functions more as a barrel to guide the measured shot, than a fluid flow conduit, since it is large in comparison to the size of the measured shot, for example, approximately ⅛th inch OD tubing of about five inches in length from check valve to outlet as compared to a metered shot of approximately 0.1 cubic centimeters in volume.

Preferably, two outlets are provided, each connected to the outlet of a different check valve on the line downstream from the solenoid valve, and located as close as possible to the points to be lubricated, one outlet being directed toward a point where it can dispense a shot of lubricant between a pin and its surrounding bushing, and another being directed toward a point where it can dispense a shot of lubricant between the bushing and the surrounding cylindrical collar or roller that spaces the parallel links of the chain.

In the preferred and illustrated embodiment of the invention, the check valve is preferably included in a measured shot valve and is positioned between the solenoid valve and the dispensing outlet. The check valve is preferably not much more than approximately one foot of the dispensing outlet, and preferably within six inches of the outlet.

The pump should be of sufficient capacity, and the supply lines sufficiently sized, to allow fluid to be supplied by the pump at a predetermined minimum flow rate and at a predetermined minimum pressure. Operating pressure is maintained in the supply line and at the solenoid valve at all times during the system operation.

Preferably, the on/off valve operates under the control of a microprocessor. A sensor is positioned adjacent the chain to detect the precise points in time that the pins pass the dispensing outlet. The microprocessor energizes the on/off valve to open when a pin is adjacent the dispensing outlet. The microprocessor counts the passing pins to energize the on/off valve once for every predetermined number of pins to pass the dispensing outlet so that only one in every predetermined number of pins is lubricated during each revolution of the chain. At the end of each complete chain revolution, the microprocessor indexes its count to cause lubrication of a different one of each predetermined number of pins than were lubricated in the previous revolution of the chain. The indexing continues such that every pin and bushing will be lubricated when the chain completes revolutions of the predetermined number.

The on/off valve is preferably a solenoid valve of a design that will open and close quickly in response to a control pulse or signal from the microprocessor. Preferably, for chains which move at 600 pins per minute, the solenoid is timed to open and close, and be ready to reopen, within 0.024 seconds. When used with a measured shot valve, the solenoid preferably opens in approximately 0.014 seconds and closes in approximately 0.01 seconds. The solenoid may remain open for approximately 0.01 to 0.10 second or longer depending on the spacing of the pins on the chain and the number of pins skipped between the pins that are lubricated. With the measured shot valve, the shot valve and pressure, and not the timing of the closing of the valve, determines the shot size. When used with a simple check valve, the solenoid, which is preferably of a higher current faster operating design, preferrably opens in approximately 0.007 seconds, remains open for the 0.010 seconds, and closes in approximately 0.005 seconds.

The solenoid valve is preferably energized with a direct current or with a current that, unlike conventional 60 Hz current, will not approach a zero value or remain at a low or zero value long enough to prevent proper and quick response of solenoid to a control signal from the microprocessor.

To maintain sufficient pressure and available flow rate at the solenoid valve, in addition to providing the capacity at the pump, plural dispensing stations are maintained in isolation from each other. In certain embodiments, this is achieved by providing separate pumps for each station, while in other embodiments, a single pump is used and the microprocessor times the operation of the valves at the different stations in such a way that no two sets of solenoids are energized simultaneously, and that they are energized at sufficiently spaced points in time to insure that the pressure and flow to one is not set of solenoids affected by the opening of those of the other.

According to the preferred method of the present invention, the solenoid valve, provided nearer to the dispensing point than to the pump, preferably in proximity, and preferably in close proximity, to the dispensing nozzle. Constantly pressurized lubricating fluid is supplied to the solenoid from a supply of predetermined minimum flow capacity through a sufficiently sized line connected from a remotely located pump and reservoir. The solenoid, when energized by a control pulse from a microprocessor based controller, delivers a predetermined quantity of lubricant through a check valve, and preferably a metered shot of lubricant through a shot valve, to and from a nozzle and onto the chain.

A microprocessor receives input signals from a sensor that are correlated to the presence of a pin of the chain adjacent the dispensing nozzle. The microprocessor counts the pins and energizes the solenoid to open it and cause the passage of fluid through the shot or check valve onto the lubricating, then closes the solenoid in sufficient time to terminate the flow of fluid to prevent lubrication of the chain beyond the desired lubrication point. With the measured shot valve, the shot valve itself limits the flow of fluid onto the chain. Where a simple check valve is used, the solenoid must operate more quickly and close more precisely under the control of the signal from the microprocessor. The microprocessor counts the passing pins and energizes the solenoid valve to cause it to dispense fluid onto one pin, then skipping a predetermined number of pins, to dispense lubricant onto the next pin, such that, for example, one in every five or ten pins is lubricated per chain revolution. After every chain revolution, which is determined by counting pins passing the sensor or by a second sensor that measures a specific mark or point on the chain, the count is indexed so that different pins are lubricated on each successive chain revolution. When all pins have been lubricated, the indexing will cause the lubrication cycle to repeat with the first set of pins being relubricated.

With the present invention, approximately fifty percent less lubricant is needed to lubricate a chain of a fiberglass oven conveyor than with several systems of the prior art. In addition, the chains are better and more effectively lubricated, experiencing less friction and requiring less power to drive them than with systems of the prior art, yielding longer chain life and lower operating energy costs. Further, substantially lower amounts of vapor and smoke from the heated oil are produced in plants utilizing the present invention than with prior systems, in most cases reducing the exhaust requirements and eliminating much of the cost of cleaning the air upon its exhaust into the outside atmosphere.

These and other objectives of the present invention will be more readily apparent from the following detailed description of the drawings of the preferred embodiment of the invention, in which:

DETAILED DESCRIPTION OF THE DRAWINGS

Figure 1:
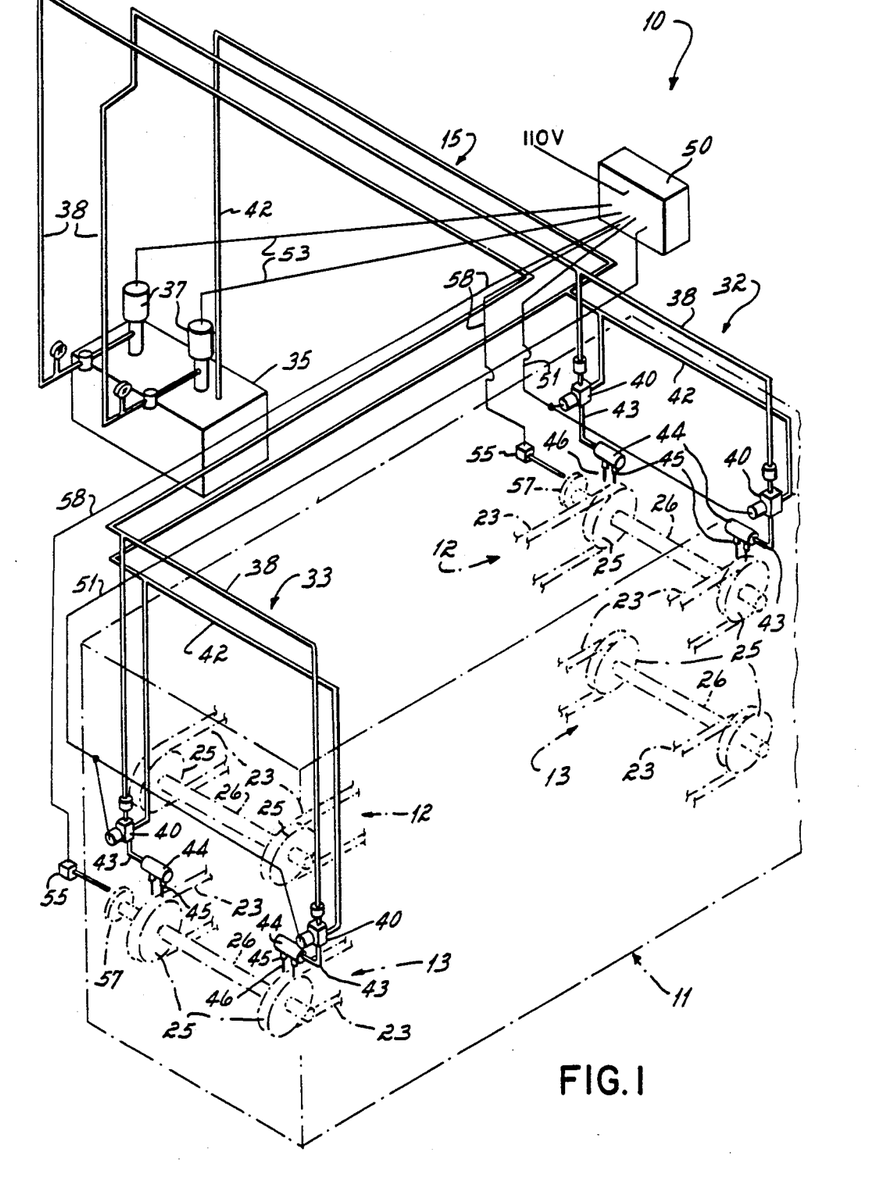
FIG. 1 is a schematic perspective diagram of a fiberglass oven equipped with one preferred embodiment of a conveyor chain lubricating system according to principles of the present invention.

Referring to FIG. 1, a fiberglass oven system 10 equipped with a conveyor chain lubricating system in accordance with the preferred embodiment of the present invention is illustrated. The oven system includes a conventional fiberglass oven 11, shown in phantom having an upper conveyor 12 and a lower conveyor 13. The oven system 10 also includes a conveyor chain lubricating system 15, shown in solid lines in FIG. 1.

Figure 3:
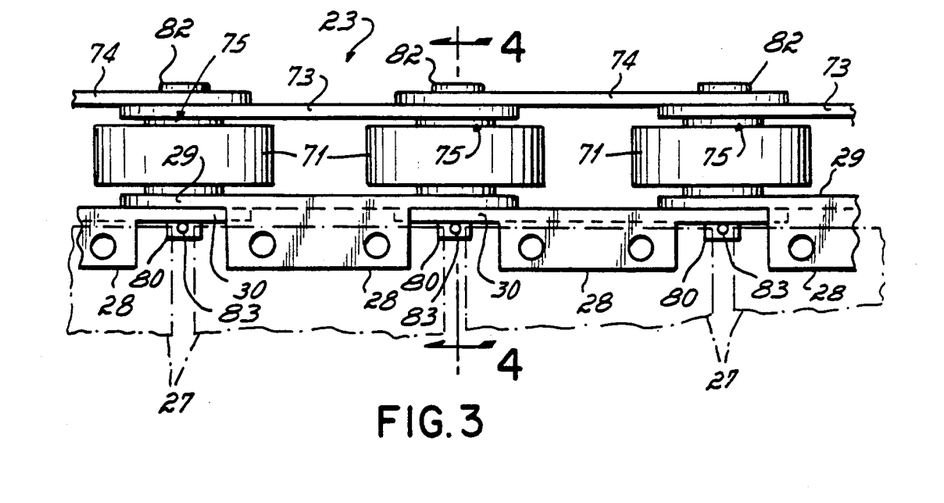
FIG. 3 is a top view of a portion of a conveyor chain of the system of FIG. 1.

The oven is typically 100 feet in length, and may operate at internal temperatures of typically 400 to 1000 degrees Fahrenheit. Through the oven are fed continuous lengths of fiberglass bats to be heat treated in their manufacture. In the oven 11 illustrated in FIG. 1, bats are fed along two paths on the flights of the two conveyors 12 and 13. Each of the conveyors 12, 13 is made up of two drive chains 23, one along each side of the oven 11. The chains 23 are each carried by a plurality of sprockets 25, only the end ones of which are illustrated in FIG. 1. The sprockets 25 are mounted in pairs, one on each end of a rotatable shaft 26 to rotate together and with the shaft 26. The shafts 26 are rotatably supported on the frame of the oven 11. One of the shafts 26 of each of the conveyors 12, 13 is a drive shaft powered by a motor (not shown), which drives the chains 23. As illustrated in FIG. 3, the other shafts 26 are idler shafts driven by the chain 23.

Fiberglass bats are carried through the oven 11 on plates 27 that span the two chains 23 of the conveyors 12, 13. The plates 27 are bolted at their opposite ends to brackets 28, rigidly connected each to a corresponding inner and outer links 29, 30 on the interior sides of the two chains 23 of each conveyor 12, 13. The bats are supported on the upper surfaces of the plates 27 and are thereby moved with the conveyors 12, 13 through the oven 11.

The lubrication system 15 includes an upper conveyor lubricating section 32 for lubricating the chains 23 of the upper conveyor 12 and located at the upstream end thereof, and a lower conveyor lubrication section 33 for lubricating the chains 23 of the lower conveyor 13, and located at the downstream end thereof. Each of the sections 32, 33 are supplied with lubricating fluid from a common reservoir 35, located remote form the oven 11, by a pump 37 on the reservoir 35. Each of the sections 32, 33 is provided with a separate pump 37 in the preferred embodiment. The pumps 37 preferably each provide a flow capacity of about 0.31 gallons per minute, and are operated at a controlled pressure of approximately 300 to 400 psi by a pressure regulator valve (not shown) located at the pump. Suitable pumps are B Series pumps, Models B154 or B354, manufactured by Delta Power Hydraulic Co.

Each of the pumps is connected through a supply line 38, preferably of rigid ⅜ inch outside diameter or larger tubing of standard wall thickness, to the inlet ports of two solenoid valves 40, located on opposite sides of the oven 11, each in proximity of less than ten feet, and preferably in close proximity of less than five feet, to the one of the chains 23 to be lubricated thereby. The solenoid valves 40 are, for example, three-way direct acting directional solenoid valves such as Honeywell 713 Series, Model 713N3, or a Skinner Multi-Use high speed valve. The valves 40 have an drain port connected to drain lines 42 maintained at approximately ambient pressure, which connect back to the reservoir 35. The solenoids also each have an outlet port that connects through a short length of tube 43 to the input of a manifold 44 having two outlets. To each of the outlets is threadedly connected the inlet of a shot valve 45. The outlets of the shot valves 45 each have connected to them a short discharge tube 46, of approximately ⅛th inch diameter tubing, not longer than approximately one foot in length, and preferably less than approximately five or six inches in length. The outlet or downstream ends 47 of the discharge tubes 46 serve as discharge nozzles.

The shot valves 45 are preferably DeLimon Lubricant Metering Elements, Type ZE-E, manufactured by DeLimon Fluhme & Co. of France, which distributes the valves in the U.S. through Bijur Lubricating Corporation of Bennington, Vt.

The solenoid valves 40 operate in response to signals from a microprocessor based controller 50 that supplies DC control signals on control lines 51. A suitable controller is, for example, Micro-Wiz Model MWB216X3, manufactured by Electronic Counters & Controls, Inc. The controller 50 also has output lines 53 connected to control the pumps 37.

A sensor 55 is provided for each system section 32, 33, adjacent a sprocket wheel 57 on the axis of a shaft 26. The sprocket wheels 57 may be a steel sprocket having the same number of teeth as the sprockets 25 to cooperate with a magnetic pickup of the sensor 55, or may otherwise carry detectable index marks such as magnets or other machine readable indicia, that will cause the sensor 55 to generate a timing signal corresponding to the presence of a pin of the chain 23 adjacent the nozzles 47. The timing signals are communicated from sensors 55 of each chain lubricating system section 32 or 33 to a separate input of the controller 50 on input lines 58.

The microprocessor of the controller 50 is programmed with information of the number of pins of the chain 23 to be lubricated. As timing signals representing the passing of a pin of the chain 23 are received from the sensor 55 by the controller 50, the timing signals, which are typically in the form of pulses, are counted to determine the relative rotational position of the chain 23. The microprocessor of the controller 50 is preferably programmed to generate an output signal on lines 51 to the solenoids 40 when every fifth pin, for example, is adjacent the nozzles 47. Then, when a complete revolution of the chain 23 has been made and every fifth pin has been lubricated, the count is indexed by, for example a count of one, and every fifth pin of a different set of pins is lubricated. After five revolutions of the chain 23, all pins will be lubricated and lubrication of the first set of pins will reoccur.

In an alternative embodiment to that illustrated, a plurality of chain lubricating system sections, as for example, upper chain lubrication system 32 and lower chain lubricating system 33, or another combination of two or more chain lubricating system sections, may be supplied from the same pump. In such an embodiment, the microprocessor of the controller 50 will prevent the solenoids 40 of the two systems from activating at the same time or from activating so close in time that the pressure and flow will not adequately deliver and accurately place the proper amount of lubricating fluid onto the chain at the pins. This timed spacing is achieved by offsetting the indexing of the count among the system sections to space the energization of the respective solenoids 40 of the different systems.

Figure 2:
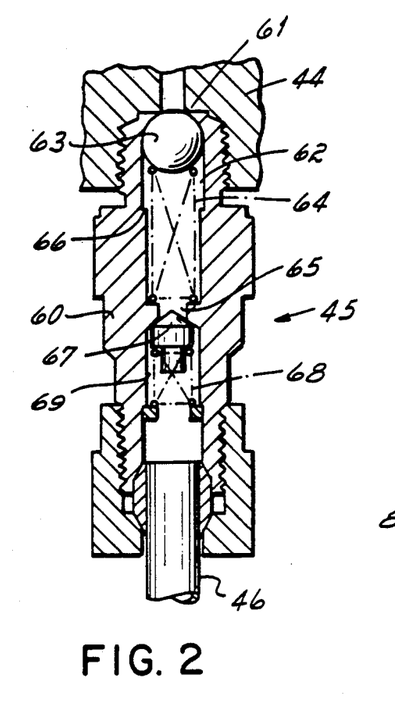
FIG. 2 is a cross sectional view through a shot valve of the system of FIG. 1.

The shot valve 45 is illustrated in detail in the cross-sectional view of FIG. 2. The valve 45 includes a housing 60 having a threaded end that has an inlet 61 therein and is threaded into an outlet of manifold 44. The inlet 61 of the inlet end of the housing 60 communicates with a cavity or chamber 62 and is closed by a ball 63. The ball 63 is biased against the inlet 61 by a spring 64 to operate to check flow from the chamber 62 back through the inlet 61. The ball 63 also is dimensioned with respect to the wall of the lower portion of the chamber 62 so that, when moved forward under pressure from fluid at the inlet 61, it displaces fluid from the cavity 62 toward a central port 65 at the opposite end of the chamber 62 from the inlet 61. A shoulder 66 formed in the wall of the cavity 62 operates as a positive stop for the forward movement of the ball 61 against the spring 64, the displacement of the ball 63 during its forward movement thus defining the volume of the fluid pumped toward and through the port 65 by the ball 63. This volume is the size of the shot generated during each forward movement of the ball 63. The measured shot of lubricating fluid delivered through the port 65 is that amount dispensed at each lubrication point of each chain.

The port 65 is maintained normally closed by a check valve 67 that is biased toward the port 65 from the downstream end thereof by a spring 68. The check valve 67 is carried in an outlet 69 in the opposite end of the housing 60 from the inlet 61. The end of the housing surrounding the outlet 69 is threaded to receive a compression fitting for the connection of the discharge tube 46.

In operation, the pressure is applied to the inlet 61 of the shot valve 45 by activation of the solenoid 40 (FIG. 1). This pressure should be in the range of from 145 to 435 psi for proper operation of the valve, and, in the embodiment of the system illustrated, is preferably up to approximately 300 to 400 psi. Under the force of the pressure of the fluid at the inlet 61, the ball 63 is moved forward in the chamber 62 against the force of the spring 64 until it reaches the stop 66. This movement of the ball 62 forces fluid from the cavity 62 through the port 65, opening the check valve 67, and causing the measured amount of fluid to be dispensed from the outlet 69 and through the discharge tube 46. When pressure at the inlet 61 is released to below 12 psi, the check valve 67 retracts first to close the port 65, and then the ball 63 returns under the force of the spring 64 to close the inlet 61. As the ball 63 returns to the inlet 61, fluid is drawn from the inlet side of the ball 63 into the chamber 62 to refill it.

Figure 4:
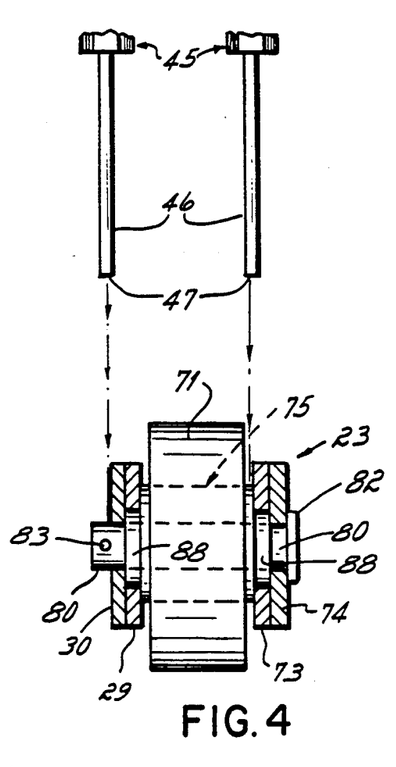
FIG. 4 is a cross sectional view through a conveyor chain of the system of FIG. 1, along the line 4—4 of FIG. 3.

The placement of the shots of lubricant on the chain 23 is illustrated in FIGS. 3 and 4. Referring to FIG. 3, a chain 23 includes a plurality of rollers 71 and corresponding pluralities of links, one including the flight supporting interior links 29, 30, and the other including exterior links on the exterior side of the chain 23. The exterior links include alternating inner exterior links 73 and outer exterior link 74. The rollers 71 each have an axial hole therethrough to carry an annular bushing 75. The inner links 29 and 73 have holes at the opposite ends thereof that slip over and are supported on a shoulder 88 on the outer surfaces of the bushings 75, at the sides of the rollers 71. The bushings 75 have a hole therethrough coaxial with the rollers 71 and through which a link pin 80 is inserted. The outer links 30 and 74 have holes at the opposite ends thereof and are mounted on the opposite ends of the pins 80. Each of the pins 80 has a head 82 on one end and a hole through a diameter on the other end through which a key pin is inserted. The outer links 30 and 74 have holes at the opposite ends thereof that slip over and are supported on the pins 80 of the adjacent rollers 71 against the sides of the bushings 75, between the bushings 75 and heads 82 of pins 80 on the exterior side of the chain 23, and between the bushings 75 and key pins 83 on the interior side of the chain 23.

As illustrated in FIG. 4, one of the nozzles 47 is directed toward the surface of the link pin 80 on the side of the chain that carries the key pin 83. A shot of lubricating oil discharged onto this surface propagates along the surface of the pin 80 to the head 82. The other nozzle that lubricates the chain 23 is directed toward the outer surface of the bushing 75 in a space between the roller 71 and the inner link 73 on the side of the chain 23 on which the head 82 of the pin 80 is located. A shot of lubricating oil discharged into this space propagates between the bushing 75 and the roller 71 along the entire outer surface of the bushing 75. Thereby, the contact surfaces between the rollers 71 and the bushings 75, which are rotatably supported in the rollers 71, and between the bushings 75 and the pins 80, which are rotatably supported in the bushings 75, are lubricated.

The nozzles 47 are positioned as close to the bushings 75 as possible, preferably at a distance of not more than a few inches. The discharge tubes 46 are similarly as short as possible, preferably less than a foot, and preferably six inches or less.

The system may, in the alternative, be provided with only check valves in place of the shot valves. In such an embodiment, the size of the shot is dependent on the fast and more precisely timed operation of the solenoid 40. The timing of the control signal to the solenoid 40 is dependent on the oil viscosity, tubing sizes and fluid pressure, and may be varied to accommodate differences in these parameters. With the parameters of the embodiment described to include the shot valve 45, replacement of the solenoid coil with a coil of half the voltage, and provision of discharge tubes 46 of ⅛ inch OD with wall thickness of 0.035 inches, welded or plugged with an insert, 1/16th inch in depth and drilled to 0.016 to 0.025 inches, depending on the viscosity of the oil, to form the nozzle 47, will operate effectively at pressures of 250 psi.

The invention has been described herein with respect to certain preferred and alternative embodiments. Those skilled in the art will appreciate, however, that various modifications of these embodiments can be made without departing form the principles of the present invention.

Accordingly, what is claimed is:

1. A conveyor chain lubricating system for depositing discrete shots of lubricant onto pins that pivotally interconnect links of a conveyor chain, the system comprising:
   a lubricating fluid reservoir having a chain lubricating fluid contained therein;
   a dispensing outlet adjacent and spaced from the conveyor chain;
   a fluid conducting line extending from the reservoir to the dispensing outlet;
   a pump connected in the line for pumping lubricating fluid from the reservoir and along the line at a predetermined pressure;
   valve means connected in the line between the pump and the outlet for opening and closing the line to the flow of fluid from the pump toward the outlet in response to a control signal;
   reverse flow preventing means, including a check valve, connected in the line downstream of the valve means and close to the outlet for retaining fluid in the line up to a point close to the outlet upon the closing of the line by the valve means, the check valve being sufficiently close to the outlet to accurately dispense, in cooperation with the valve means, a discrete metered shot of fluid from the outlet onto a point of the chain to be lubricated;
   sensor means for generating a timing signal related to a predetermined position of a each pin of the conveyor chain with respect to the outlet; and
   controller means responsive to timing signals from the sensor means for generating the control signal to operate the valve means to cause a momentary flow of lubricating fluid through the line and from the outlet onto the chain near a pin thereof.

2. The system of claim 1 wherein:
   the controller including means for counting the timing signals and generating the control signal in response to one of a predetermined number of timing signals to cause the dispensing of lubricant onto the chain near one of the predetermined number of pins thereof; and
   the controller including means determining the complete rotation of a chain and means for indexing the generation of the control signals so as to cause the dispensing of lubricant onto the chain near a different one of the predetermined number of pins thereof, the indexing means being operative to index the generation of the control signals to cause the dispensing of lubricant onto the chain near all of the pins thereof.

3. The system of claim 2 for also depositing discrete shots of lubricant onto pins that pivotally interconnect links of a chain of a second conveyor, the system further comprising:
   a second dispensing outlet adjacent the chain of the second conveyor;
   a second fluid conducting line extending to the second dispensing outlet;
   the pump being connected so as to pump lubricating fluid from the reservoir into and along the second line at a predetermined pressure;
   second valve means connected in the second line between the pump and the second outlet for opening and closing the second line to the flow of fluid from the pump toward the second outlet in response to a second control signal, the second valve means being located in the second line nearer to the second outlet than to the reservoir;

second reverse flow preventing means including a second check valve connected in the second line between the second valve means and the second outlet to prevent reverse fluid flow therein in response to the closing of the second line by the second valve means;

second sensor means for generating a second timing signal related to a predetermined position of a each pin of the chain of the second conveyor with respect to the second outlet; and the controller means responsive to the second timing signals from the second sensor means for generating the second control signal to operate a second valve means to cause the momentary flow of lubricating fluid through the second line and from the second outlet onto the second chain near a pin thereof, the controller means including means responsive to the timing signals to offset the control signals in time to prevent the simultaneous operation of the two valve means.

4. The system of claim 2 wherein:
the check valve is located along the line within approximately one foot of the outlet.

5. The system of claim 4 wherein:
the check valve is located along the line within six inches of outlet.

6. The system of claim 2 wherein the reverse flow preventing means includes a measured shot valve connected in the line and located between the valve means and the outlet, the shot valve including the check valve.

7. The system of claim 6 wherein the controller means is operative to energize the valve means to open the line for approximately 0.010 seconds and to close the line before the next control signal is generated.

8. The system of claim 2 wherein the controller means is operative to energize the valve means with a direct current pulse control signal.

9. The system of claim 2 wherein the line includes a dispensing tube connected between the check valve and the outlet a distance of less than one foot from the outlet, the dispensing tube having a inside diameter of approximately 0.055 inches, the dispensing outlet having an orifice therethrough with a diameter of approximately 0.02 inches.

10. The system of claim 2 wherein the valve means includes fluid recirculating loop means including a return line connected between the valve and the reservoir for sustaining fluid flow and pressure on the fluid conducting line between the reservoir and the valve means when the valve means is closed.

11. A conveyor chain lubricating system for constantly depositing discrete shots of lubricant onto pins that pivotally interconnect links of a high speed conveyor chain carrying product through a high temperature apparatus, the system comprising:
a lubricating fluid reservoir located remote from the chain and having a chain lubricating fluid contained therein:
a stationary dispensing outlet adjacent and spend from the conveyor chain in fixed relationship therewith;
a fluid conducting line extending from the reservoir to the dispensing outlet;
a pump connected in the line for pumping lubricating fluid from the reservoir and along the line at a predetermined pressure;
high speed valve means connected in the line between the pump and the outlet and located closer to the outlet than to the reservoir for opening and closing the line to the flow of fluid from the pump toward the outlet in response to a control signal;
reverse flow preventing means including a check valve connected in the line between the valve means and the outlet, closer to the outlet than to the valve means and sufficiently close to the chain to accurately dispense a metered shot of fluid thereon, for for retaining fluid in the line downstream of the valve means and to a point close to the outlet upon the closing of the line by the valve means;
stationary non-contact sensor means mounted in a fixed position adjacent the chain for generating a timing signal related to a predetermined position of a each pin of the conveyor chain with respect to the outlet; and
controller means responsive to timing signals from the sensor means for generating the control signal to operate the valve means to cause a momentary flow of lubricating fluid through the line and from the outlet onto the chain near a pin thereof.

12. The system of claim 11 wherein the valve means is located along the line in proximately to the outlet.

13. The system of claim 12 wherein the valve means is located along the line within ten feet of the outlet.

14. The system of claim 11 wherein the valve means is located along the line in close proximately to the outlet.

15. The system of claim 14 wherein the valve means is located along the line within five feet of the outlet.

16. The system of claim 11 for also depositing discrete shots of lubricant onto pins that pivotally interconnect links of a chain of a second conveyor, the system further comprising:
a second dispensing outlet adjacent the chain of the second conveyor;
a second fluid conducting line extending to the second dispensing outlet;
a second pump connected in the second line for pumping lubricating fluid from the reservoir along the second line at a predetermined pressure;
second valve means connected in the second line between the second pump and the second outlet for opening and closing the second line to the flow of fluid from the second pump toward the second outlet in response to a second control signal, the second valve means being located in the second line nearer to the second outlet than to the reservoir;
second reverse flow preventing means including a second check valve connected in the second line between the second valve means and the second outlet to prevent reverse fluid flow therein in response to the closing of the second line by the second valve means; and
second sensor means for generating a second timing signal related to a predetermined position of a each pin of the chain of the second conveyor with respect to the second outlet; and
the controller means responsive to the second timing signals from the second sensor means for generating the second control signal to operate a second valve means to cause the momentary flow of lubricating fluid through the second line and from the second outlet onto the second chain near a pin thereof.

17. The system of claim 11 wherein the reverse flow preventing means includes a measured shot valve connected in the line and located between the valve means and the outlet, the shot valve including the check valve.

18. The system of claim 11 wherein the valve means includes fluid recirculating loop means including a return line connected between the valve and the reservoir for sustaining fluid flow and pressure on the fluid conducting line between the reservoir and the valve means when the valve means is closed.

19. A conveyor chain lubricating system for depositing discrete shots of lubricant onto pins that pivotally interconnect links of at least two commonly driven chains of the conveyor and onto bushings that surrounded the pins, the system comprising:
   a lubricating fluid reservoir;
   at least two dispensing outlets adjacent each chain the conveyor;
   a fluid conducting line extending from the reservoir, the line having at least two branches, one branch being connected to each of the outlets;
   a pump connected in the line for pumping lubricating fluid from the reservoir and along the line at a predetermined pressure;
   valve means connected in the line between the pump and the outlets for opening and closing the branch to the flow of fluid from the pump toward the outlets in response to a control signal;
   at least four measured shot valves, including at least two shot valves connected in each branch, one shot valve being connected in each branch between each outlet and the valve means, each shot valve including reverse flow preventing means, including a check valve, located sufficiently close to a respective one of the outlets to retain fluid in the respective branch up to a point close to the outlets upon the closing of the line by the valve means;
   sensor means for generating a timing signal related to a predetermined position of each pin of the chains of the conveyor with respect to the outlets; and
   controller means responsive to timing signals from the sensor means for generating the control signal to operate the at least two valve means to cause a momentary flow of lubricating fluid through the line and the branches thereof and from the outlets onto each chain near a pin thereof;
   the controller including means for counting the timing signals and generating the control signal in response to one of a predetermined number of timing signals to cause the dispensing of lubricant onto the chains near one of the predetermined number of pins thereof; and
   the controller including means determining the complete rotation of the chains and means for indexing the generation of the control signals so as to cause the dispensing of lubricant onto the chains near different ones of the predetermined number of pins of each, the indexing means being operative to index the generation of the control signals to cause the dispensing of lubricant onto the chains near all of the pins thereof.

20. The system of claim 19 wherein the controller means is operative to energize the valve means to open the line for approximately 0.010 seconds and to close the line before the generation of the next control signal.

21. The system of claim 19 wherein the controller means is operative to energize the valve means with a direct current pulse control signal.

22. The system of claim 19 wherein the reservoir is located remote from the conveyor and the valve means is located closer to the dispensing outlet than to the reservoir.

23. The system of claim 19 wherein the valve means includes fluid recirculating loop means including a return line connected between the valve and the reservoir for sustaining fluid flow and pressure on the fluid conducting line between the reservoir and the valve means when the valve means is closed.

24. A method of applying high temperature lubricating fluid to pins that pivotally interconnect links of the chains of the conveyor for carrying running lengths of product through ovens; the method comprising the steps of:
   supplying a high temperature lubricating fluid from a reservoir;
   pumping the lubricating fluid along a fluid supply line at a sustained pressure to a valve;
   sensing the position of a pin of a chain of the conveyor adjacent a dispensing outlet and generating a timing signal in response thereto;
   opening the valve in response to the timing signal to deliver the pressurized fluid further along the line to a reverse flow preventing device, located sufficiently close to the chain to dispense a measured shot of fluid, from an outlet located close to and spaced from the chain, accurately onto the chain, to cause the reverse flow preventing device to open to allow the forward flow of a discrete single shot of the lubricating fluid to flow therethrough and onto the chain;
   closing the valve, and in response thereto closing the reverse flow preventing device valve to stop the forward flow of pressurized fluid therethrough in sufficient time after the opening thereof to permit only the flow of the discrete shot of fluid therethrough;
   counting the timing signals and opening the valve in response to one of a predetermined number of timing signals to cause the dispensing of lubricant onto the chain near one of every predetermined number of pins thereof;
   further counting the timing signals and from the count determining the complete rotation of the chain; and
   indexing the step of opening the valve to cause the dispensing of lubricant onto the chain near different ones of the predetermined number of pins so as to cause the dispensing of lubricant onto the chain near all of the pins thereof upon the revolution of the chain the predetermined number of times.

25. The method of claim 24 further comprising the step of:
   guiding the dispensed metered shot from the check valve toward the chain.

26. The method of claim 24 further comprising the step of:
   metering the size of the shot at the reverse flow preventing device.

27. The method of claim 24 further comprising the step of:

metering the size by controlling the opening and closing times of the valve.

28. The method of claim 24 wherein the valve is a solenoid valve and is opened in response to a direct current pulse control signal.

29. The method of claim 24 further comprising the step of:
while the valve is closed, recirculating the fluid from the valve to the reservoir and sustaining the pressure on the line between the pump and the valve.

* * * * *